United States Patent
Pryor, Jr.

(10) Patent No.: US 7,040,799 B2
(45) Date of Patent: May 9, 2006

(54) STIRRING STICK

(75) Inventor: Ernest B. Pryor, Jr., Glen Allen, VA (US)

(73) Assignee: Hamilton Beach/Procter-Silex, Inc., Glen Allen, VA (US)

( * ) Notice: Subject to any disclaimer, the term of this patent is extended or adjusted under 35 U.S.C. 154(b) by 179 days.

(21) Appl. No.: 10/603,450

(22) Filed: Jun. 24, 2003

(65) Prior Publication Data

US 2004/0264294 A1 Dec. 30, 2004

(51) Int. Cl.
*B01F 13/00* (2006.01)
*B01F 15/00* (2006.01)

(52) U.S. Cl. .................. 366/199; 366/205; 366/343

(58) Field of Classification Search ............ 366/343, 366/129, 197, 199, 205; D7/412, 619
See application file for complete search history.

(56) References Cited

U.S. PATENT DOCUMENTS

| | | | | |
|---|---|---|---|---|
| 339,514 A | * | 4/1886 | Averill | D7/691 |
| 1,211,062 A | * | 1/1917 | Bowman | 30/324 |
| D77,900 S | * | 3/1929 | Lawson | D7/691 |
| 2,294,096 A | * | 8/1942 | Rice | 30/149 |
| 2,559,168 A | * | 7/1951 | Numbers | 141/381 |
| 2,802,605 A | * | 8/1957 | Parker | 222/215 |
| 3,088,345 A | | 5/1963 | Campbell | |
| 3,346,029 A | | 10/1967 | Harris, Jr. | |
| 3,417,972 A | | 12/1968 | Vincent | |
| 3,461,554 A | * | 8/1969 | Aykanian | 30/141 |
| 3,609,776 A | * | 10/1971 | Haldopoulos et al. | 4/295 |
| 3,895,548 A | | 7/1975 | Sauve | |
| 4,137,578 A | | 2/1979 | Felici | |
| 4,250,771 A | | 2/1981 | Berler | |
| 4,268,080 A | * | 5/1981 | Lindley | 294/1.1 |
| 4,397,427 A | | 8/1983 | Howard | |
| 4,561,782 A | | 12/1985 | Jacobsen et al. | |
| D309,399 S | | 7/1990 | Barnard et al. | |
| D309,400 S | | 7/1990 | Barnard | |
| D319,556 S | | 9/1991 | Purkapile | |
| 5,048,728 A | * | 9/1991 | Gomez Acevedo | 222/215 |
| 5,302,021 A | | 4/1994 | Jennett et al. | |
| D372,650 S | * | 8/1996 | Bundy | D8/14 |
| D376,515 S | * | 12/1996 | Powers | D7/691 |
| 5,636,390 A | * | 6/1997 | Strech | 4/295 |
| 5,662,032 A | | 9/1997 | Baratta | |
| D424,874 S | | 5/2000 | Anton et al. | |
| D426,108 S | | 6/2000 | Anton et al. | |
| D426,742 S | | 6/2000 | Gartz et al. | |
| D436,810 S | | 1/2001 | Slater | |
| D454,754 S | | 3/2002 | Jacober et al. | |
| 6,454,455 B1 | | 9/2002 | Jungvig | |
| D465,127 S | | 11/2002 | Lee | |
| 6,488,403 B1 | | 12/2002 | Lawson | |

(Continued)

*Primary Examiner*—Tony G. Soohoo
(74) *Attorney, Agent, or Firm*—Adin Gump Straus Hauer & Feld, LLP

(57) ABSTRACT

A stirring stick for manipulating foodstuff in a blender comprises an elongate plunger having first and second ends. The plunger has a cavity extending between the first and second ends. At least a portion of the plunger is generally trough-shaped, and the cavity is open at least at the second end. A handle is attached to the first end of the plunger. A user may move the stirring stick in one or more directions when the stirring stick is positioned in the blender.

8 Claims, 4 Drawing Sheets

U.S. PATENT DOCUMENTS

| | | |
|---|---|---|
| D470,022 S | 2/2003 | Knapp |
| 6,527,433 B1 * | 3/2003 | Daniels, Jr. .................. 366/205 |
| D495,926 S * | 9/2004 | Nikkhah ..................... D7/412 |
| 6,935,767 B1 * | 8/2005 | Nikkhah ..................... 366/129 |
| 2001/0006486 A1 | 7/2001 | Ofverberg |
| 2002/0080678 A1 * | 6/2002 | Daniels, Jr. .................. 366/205 |
| 2005/0018532 A1 * | 1/2005 | Nikkah ....................... 366/129 |

* cited by examiner

STIRRING STICK

BACKGROUND OF THE INVENTION

The present invention relates generally to utensils used with blenders, and more specifically to stirring utensils inserted into blender jars for mixing foodstuff within the blender jar and/or scraping the sides of the blender jar.

Blenders and stirring utensils used in blenders are generally known in the art. Stirrers used in blenders have a variety of shapes and sizes and are designed to accomplish a variety of tasks. For example, a stirrer may be used to help mix the foodstuff in a blender jar or push the foodstuff toward the rotating blades to improve the blending performance of the foodstuff within the blender jar. That is, if solid foodstuff is inserted into a mixture in the blender jar, the solid material placed into the blender jar may need assistance in being pushed into the mixture so that it is brought into contact with the rotating blades. Alternatively, a stirrer may be inserted which is capable of scraping the sides of the blender jar, thereby removing excess foodstuff from the sides of the blender jar and directing it back into the mixture and/or toward the rotating blades at the bottom of the jar. A stirrer may also be shaped to prevent cavitation of the blended foodstuff in the blender jar. Stirrers are also often used in combination with blender lids by inserting the stirrer through an opening in the blender lid.

However, it would be advantageous to those using a blender to be able to safely and effectively remove foodstuff from the blender jar during the blending process, while still being able to stir, mix and scrape the foodstuff within the blender jar using the same utensil. The stirrers disclosed by the prior art require that some other utensil, for example a spoon, be used to remove foodstuff from the blender jar, thereby requiring removal of the stirrer being used, and turning off the blender to insure safe removal of the foodstuff. Additionally, the stirrers disclosed by the prior art similarly require removal of the stirring stick and/or lid to expose an opening to the blender jar before additional foodstuff can be added to the blender jar. Finally, it would also be advantageous to have a blender utensil which can be used in conjunction with the lid covering the blender jar. That is, many of the stirring sticks disclosed by the prior art are used alone (i.e., without a blender lid), such that blending of the foodstuff must cease when the stirrer is in use, since blending without a lid is dangerous and messy. Thus, the present invention provides a stirring stick which can be used to remove foodstuff from the blender jar and be manipulated with the lid in place on the blender jar to scoop, mix and scrape foodstuff within the blender jar.

BRIEF SUMMARY OF THE INVENTION

Briefly stated, according to a first aspect of the present invention, a stirring stick for manipulating foodstuff in a blender includes an elongate plunger having first and second ends. The plunger includes a cavity which extends between the first and second ends, such that at least a portion of the plunger is generally trough shaped. The cavity is open at least at the second end of the plunger. A handle is attached to the first end of the plunger, such that a user may move the stirring stick in one or more directions when the stirring stick is positioned in the blender.

According to a second aspect of the present invention, a blender for blending foodstuff includes a base containing a motor. A blender jar is releasably attached to the base. The blender jar is open at a top end and closed at a bottom end. A blade set is drivingly connected to the motor and extends into the blender jar from the bottom end of the blender jar. A lid having an opening extending therethrough covers a substantial portion of the top end of the blender jar. A stirring stick extends through the opening in the lid and into the blender jar from the top end. The stirring stick includes an elongate plunger having first and second ends. The plunger has a cavity extending between the first and second ends such that at least a portion of the plunger is generally trough shaped. The cavity is open at least at the second end. A handle is attached to the first end of the plunger, such that a user may move the stirring stick in one or more directions when the stirring stick is positioned in the blender.

BRIEF DESCRIPTION OF THE SEVERAL VIEWS OF THE DRAWINGS

The foregoing summary, as well as the following detailed description of the presently preferred embodiments of the invention, will be better understood when read in conjunction with the appended drawings. For the purpose of illustrating the invention, there are shown in the drawings embodiments which are presently preferred. It should be understood, however, that the present invention is not limited to the particular arrangements and instrumentalities shown.

In the drawings.

DETAILED DESCRIPTION OF THE INVENTION

Figure 1:
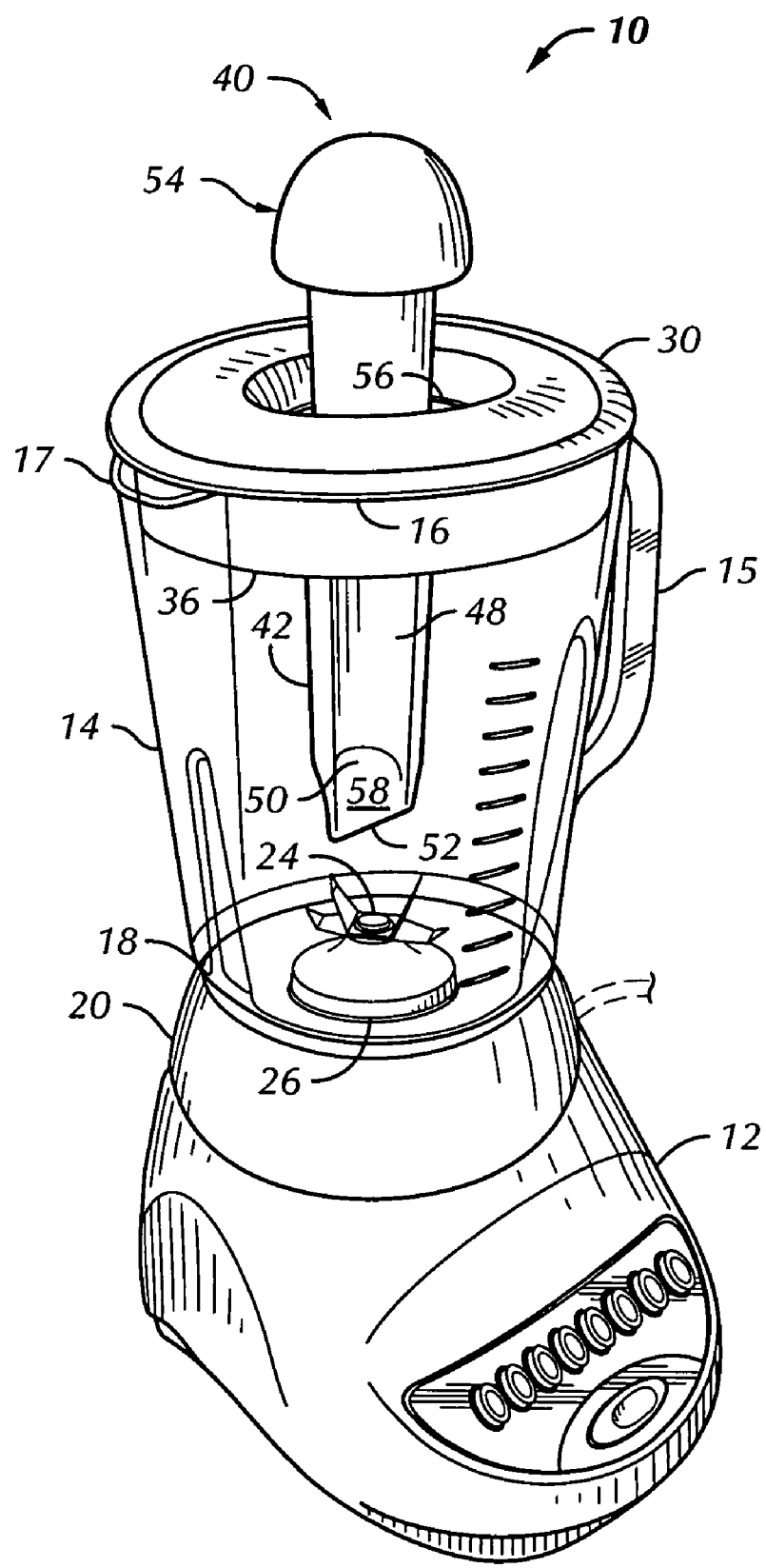
FIG. 1 is a perspective view of a blender with a stirring stick in accordance with a first preferred embodiment of the present invention.

Certain terminology is used in the following description for convenience only and is not limiting. The words "right", "left", "lower" and "upper" designate directions in the drawings to which reference is made. The words "inwardly" and "outwardly" refer to directions toward and away from, respectively, the geometric center of the blender and/or stirring stick and designated parts thereof. The terminology includes the words above specifically mentioned, derivatives thereof and words of similar import.

Referring to the drawings in detail, wherein like numerals indicate like elements throughout, there is shown in FIGS. 1–5 a first preferred embodiment of a blender, generally designated 10, for mixing and blending foodstuff in accordance with the present invention. The blender 10 includes a base 12 which contains a motor (not shown). Motors for blenders are generally known in the art, and a description thereof is omitted here for purposes of convenience only and should not be considered limiting. The base 12 is preferably made of polypropylene, although other materials, such as aluminum or other metals, may be used without departing from the spirit and scope of the present invention.

A blender jar 14 is releasably attached to the base 12. The blender jar 14 has an open top end 16 and a bottom end 18. The blender jar 14 is generally cylindrical in shape and is preferably made of glass or a transparent polymeric material. Those skilled in the art will recognize that the blender jar 14 may take other shapes and/or be made of other materials (such as durable plastic) without departing from the sprit and scope of the present invention. The blender jar 14 includes a handle 15 for gripping the blender jar 14. A pouring lip 17 is located on a section of the periphery of the top end 16 of the blender jar 14. The pouring lip 17 is generally 180° around the top end 16 of blender jar 14 from the handle 15, and aids in dispensing foodstuff from the blender jar 14 when the blender jar 14 is tilted by a user. The bottom end 18 of the blender jar 14 threadedly engages a locking portion 20, such that the blender jar 14 securely but removably attaches to the base 12. The locking portion 20 is moveable on the base 12 between a locked position (see FIGS. 1 and 2) and an unlocked position (not shown). When the locking portion 20 is in the unlocked position, the blender jar 14 may be removed from the base 12 for cleaning. In the locked position, the locking portion 20 (and thus the blender jar 14) is secured to the base 12.

A blade set 24 is drivingly connected to the motor in the base 12. The blade set 24 is connected to a motor housing 26 which engages the motor through the locking portion 20. The blade set 24 extends upwardly from the motor housing 26 and into the bottom end 18 of the blender jar 14. When the blade set 24 is properly positioned within the blender jar 14 and the blender jar 14 is attached to the locking portion 20, the bottom end 18 of the blender jar 14 is sealed such that no liquid can escape from the bottom end 18.

A lid 30 covers a substantial portion of the top end 16 of the blender jar 14. The lid 30 has a shape which generally conforms to the shape of the open top end 16 of the blender jar 14, and snugly fits into and over the blender jar 14 to substantially cover the top end 16. The lid 30 includes a generally circular flange 36 which extends downwardly from the bottom side of the lid 30. The flange 36 sealingly contacts the interior sidewalls of the blender jar 14 to help the lid 30 snugly fit within and over the top end 16. The lid 30 is made of a flexible polymeric material, although other similar materials such as rubber may be used without departing from the spirit and scope of the present invention. The lid 30 has an opening 32 in the central portion thereof (see FIG. 2). The opening 32 is generally circular in shape and provides access to the interior of the blender jar 14 through the lid 30. For example, foodstuff may be deposited into the blender jar 14 through the opening 32 even with the lid 30 in place over the top end 16. The portion of the lid 30 which boarders the opening 32 preferably tapers inwardly toward a circumferential lip 34, such that the opening 32 and the lip 34 complimentarily receive a stirring stick 40 (discussed in greater detail below).

Figure 2:
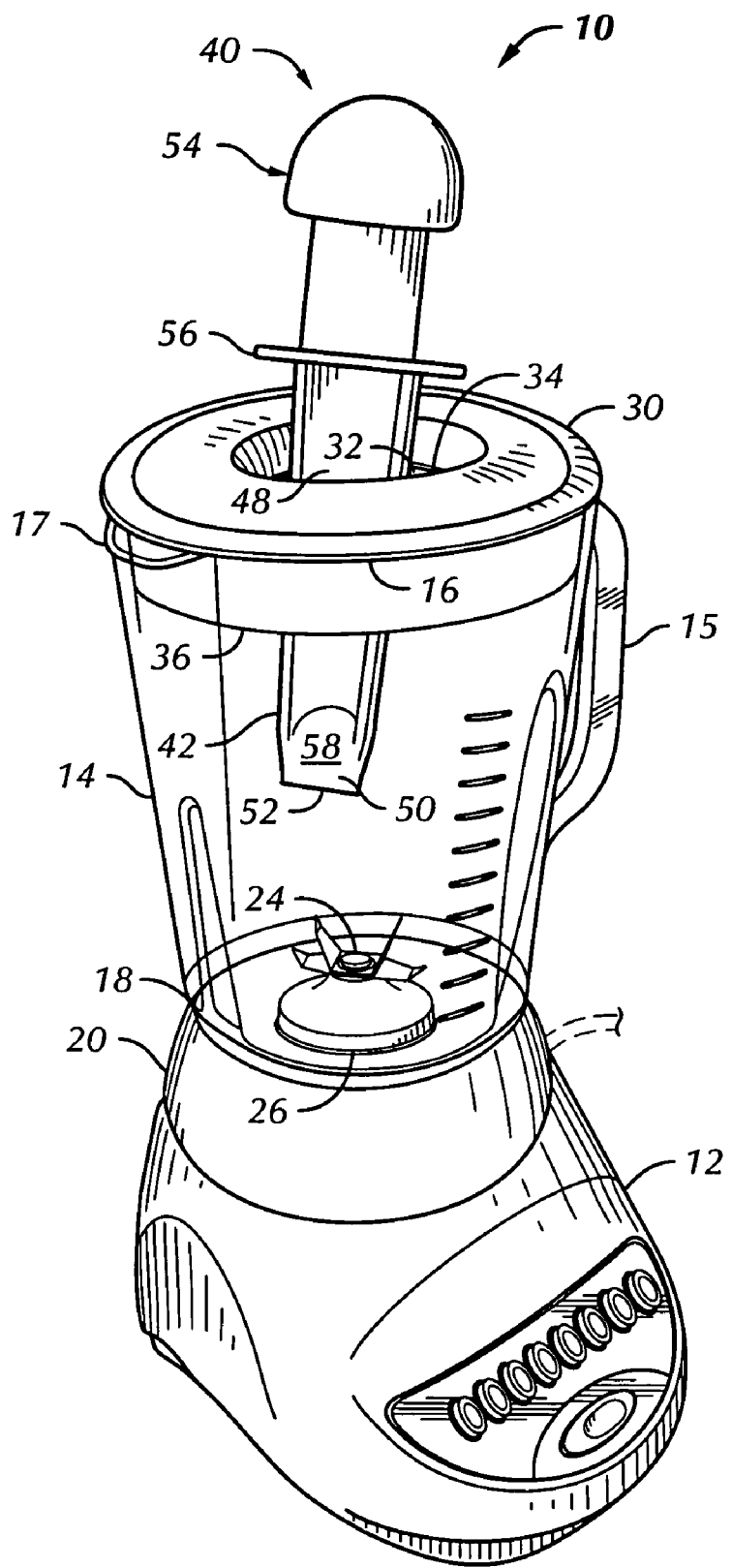
FIG. 2 is a perspective view of the blender with the stirring stick of FIG. 1 with the stirring stick tilted in a use position.
Figure 3:
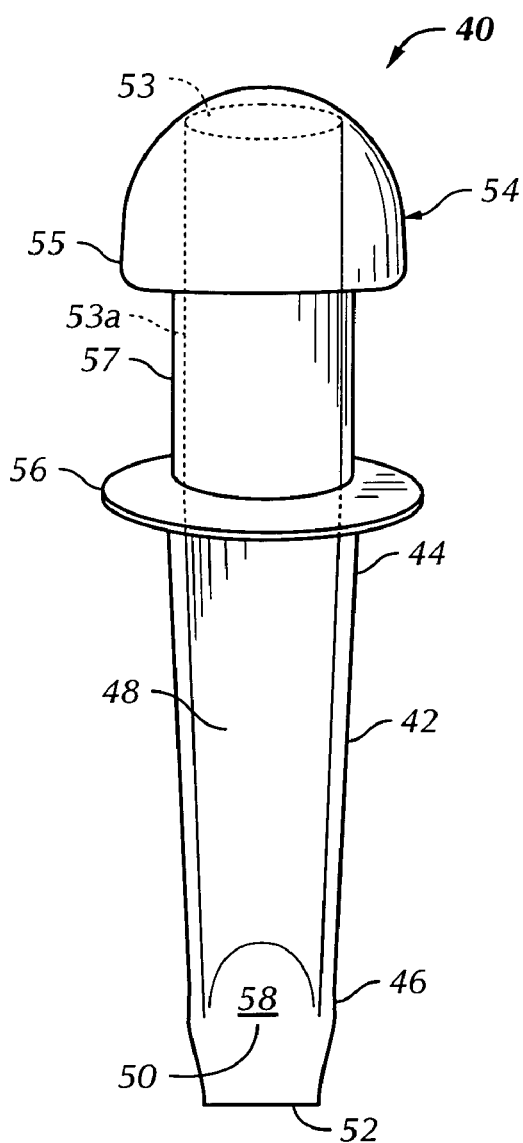
FIG. 3 is a front elevational view of the stirring stick of FIG. 1.
Figure 4:
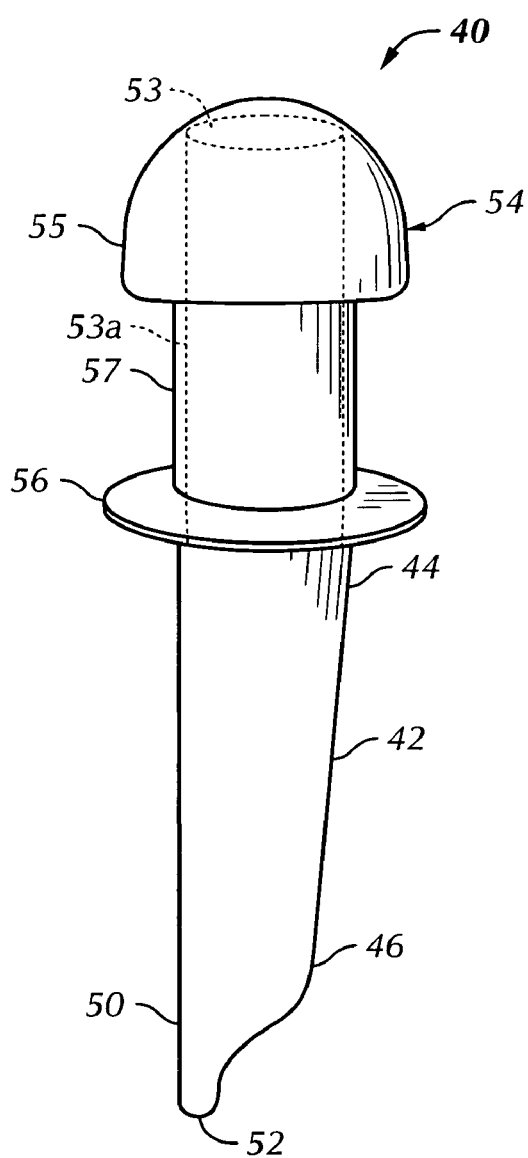
FIG. 4 is a side elevational view of the stirring stick of FIG. 1.

Referring to FIGS. 1–5, the blender 10 further includes a stirring stick 40 which, when in use as shown in FIGS. 1 and 2, extends through the opening 32 in the lid 30 and into the blender jar 14 from the top end 16.

The stirring stick 40 includes an elongate plunger 42 having a first end 44 and a second end 46. The plunger 42 includes a cavity 48 which extends between the first and second ends 44, 46, respectively, such that at least a portion of the plunger 42 is generally trough-shaped. Those skilled in the art will recognize that the plunger 42 may take the shape of a parallelepiped, a cylinder or other shapes without departing from the spirit and scope of the present invention. The cavity 48 is open at least at the second end 46. That is, the cavity 48 may be completely uncovered (as shown, for example, in FIG. 5), thereby being open along its entire length. The cavity 48 may also be partially covered over by a portion of the plunger 42, such that a hollow interior portion (not shown) is formed along a length of the plunger 42. Alternatively, the cavity 48 may be substantially covered over (not shown) by a portion of the plunger 42, such that the cavity 48 is open only near the second end 46. In such a case, access to the cavity 48 is only possible at the second end 46. The cavity 48 is capable of receiving blended or partially blended foodstuff to be removed from or maneuvered within the blender jar 14.

Figure 5:
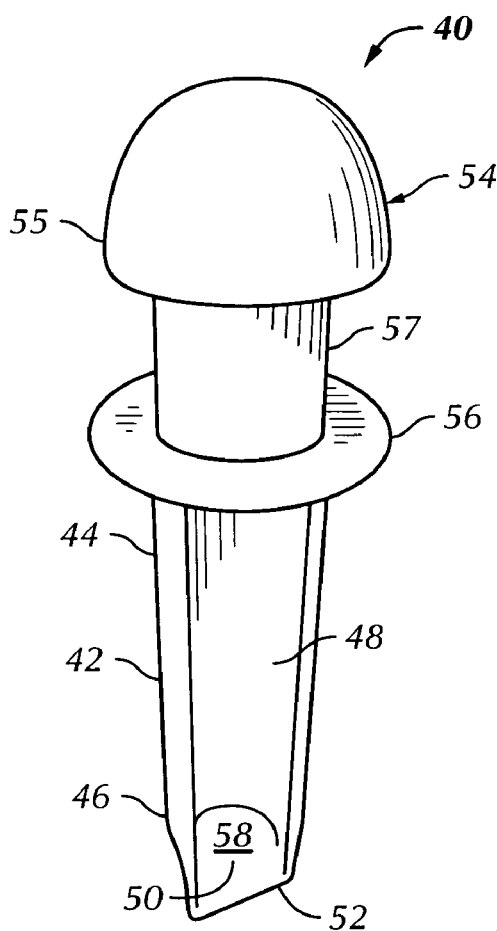
FIG. 5 is a perspective view of the stirring stick of FIG. 1.

The stirring stick 40 further includes a scoop 50 attached to the second end 46 of the plunger 42. The scoop 50 is shaped to help guide foodstuff in the blender jar 14 into the cavity 48. For example, as shown in FIG. 5, the scoop 50 has a generally curved face 58, such that when the stirring stick 40 is manipulated within the blender jar 14, the foodstuff within the blender jar 14 is guided by the curved face 58 of the scoop 50 into the cavity 48 of the stirring stick 40. The user of the blender 10 can further manipulate the stirring stick 40 to remove the foodstuff located within the cavity 48 from the blender jar 14 or deposit the foodstuff in another portion of the blended mixture within the blender jar 14.

A plunger tip 52 is attached to the scoop 50. The plunger tip 52 is preferably formed as a sharp scraping edge, such that when the stirring stick 40 is manipulated near the sides of the blender jar 14, the plunger tip 52 may be used to scrape foodstuff from the side walls of the blender jar 14. Additionally, the plunger tip 52 may be used to push food downwardly in the blender jar 14 toward the blade set 24 without touching the sides of the blender jar 14. The plunger tip 52 may also be used to stir or mix the foodstuff within the blender jar 14 as it is being blended.

Figure 6:
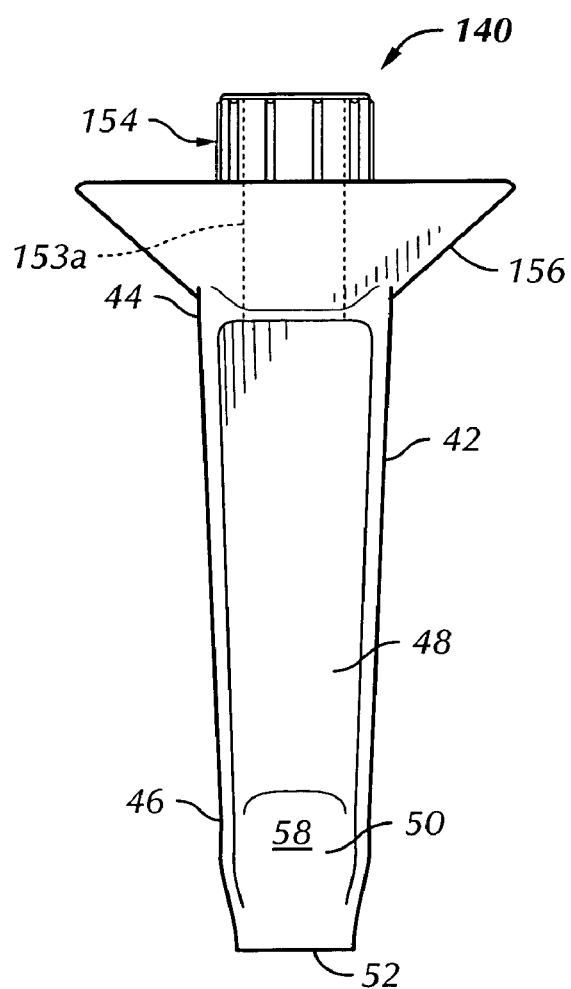
FIG. 6 is a front elevational view of a stirring stick used with the blender of FIG. 1 according to a second preferred embodiment of the present invention.

The stirring stick 40 further includes a handle 54 attached to the first end 44 of the plunger 42. The handle 54 includes a generally cylindrical lower portion 57 attached to the first end 44 of the plunger 42. A top portion 55 of the handle 54 is generally semi-spherical in shape, such that the top portion 55 conveniently fits within and may be gripped by a user's hand. Thus, a user may grip the handle 54 to manipulate the stirring stick 40 within the blender jar 14. Those skilled in the art will recognize, however, that the handle 54 may take other shapes and sizes to provide different types of grips for the user, such as the ribbed handle 154 shown in FIG. 6, without departing from the spirit and scope of the present invention.

A collar 56 is disposed between the first end 44 of the plunger 42 and the cylindrical portion 57 of the handle 54. The collar 56 has a diameter which is substantially larger than the diameter of the opening 32 in the lid 30. When the stirring stick 40 is inserted through the opening 32, the collar 56 prevents the stirring stick 40 from entering the blender jar 14 to the point where the plunger tip 52 could contact the blade set 24. The collar 56 is preferably generally disc-shaped, or flat, such that the collar 56 rests against the lip 34. The stirring stick 40 may be tilted by a user on the collar 56 to maneuver the stirring stick 40 within the opening 32. As shown in FIG. 2, using the handle 54, the stirring stick 40 may be manipulated on the lid 30 and/or lip 34 to direct the plunger 42 toward different portions of the interior of the blender jar 14. In an alternative embodiment, the collar 156 may be generally frustroconical in shape, such that the stirring stick 140 swivels within the opening 32 of the lid 30 upon manipulation of the handle 154 by the user (see FIG. 6).

The blender 10 is assembled by attaching the blender jar 14 to the locking portion 20, such that the motor housing 26 and blade set 24 project into the blender jar 14 from the bottom end 18. The locking portion 20 (including the blender jar 14) is then attached to the base 12 and secured in the locked position. Foodstuff is then deposited into the blender jar 14 for blending. The lid 30 is then placed over the top end 16 of the blender jar 14 to substantially close the top end 16 of the blender jar 14. The stirring stick 40 is then inserted into the blender jar 14 through the opening 32 in the lid 30. The blade set 24 is then energized to blend the foodstuff within the blender jar 14.

During blending, the stirring stick 40 may be manipulated by the user within the opening 32, using the handle 54, to help stir the foodstuff in the blender jar 14. Further, the stirring stick 40 may be maneuvered such that the plunger tip 52 of the stirring stick 40 contacts the interior side walls of the blender jar 14 to scrape additional foodstuff from the blender jar 14 and direct it downward into the blended mixture. In addition to manipulating the stirring stick 40 in a generally circular or side to side fashion within the blender jar 14, the stirring stick 40 may be moved upward and downward in the blender jar 14, such that the plunger 42 of the stirring stick 40 may be used to help direct foodstuff in the blender jar 14 toward the blade set 24 for further blending. Additionally, the stirring stick 40 may be completely removed from the blender jar 14 (and thus the blended mixture of foodstuff) while the blade set 24 is energized. In this manner, foodstuff may be removed from the blender jar 14 by scooping foodstuff with the scoop 50 into the cavity 48 and removing the stirring stick 40 from the blender jar 14. Similarly, additional foodstuff may be added to the blender jar 14 through the opening 32 during blending of the mixture. Accordingly, foodstuff may be added or removed to/from the blender jar 14 during operation of the blender 10 without concern for contacting the blade set 24 while still having a substantial portion of the top end 16 covered. The collar 56 on the stirring stick 40 prevents the stirring stick 40 from entering the blender jar 14 to the point where the plunger tip 52 contacts the rotating blade set 24.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A stirring stick for manipulating foodstuff in combination with a blender, the combination comprising:
   a blender base containing a motor;
   a blender jar releasably attached to the base, the blender jar being open at a top end and closed at a bottom end;
   a blade set drivingly connected to the motor, the blade set extending into the blender jar proximate the bottom end;
   an elongate plunger having first and second ends, the plunger having a single trough-shaped cavity extending between the first and second ends, the cavity having first and second side edges, the cavity being open between the first and second side edges to form a tapered opening extending from the first end to the second end;
   a scoop attached to the second end of the plunger, the scoop having a plunger tip forming a continuous, substantially planar, straight scraping edge separate from and extending beyond the first and second side edges;
   a handle attached to the first end of the plunger, the handle including a generally disc-shaped collar connected to the first end of the plunger, a constant diameter cylindrically shaped portion connected to the collar, and a top grippable portion having a semi-spherically shaped dome and a substantially planar base, the top portion being connected to the cylindrical portion at the base.

2. The stirring stick of claim 1, wherein the collar has an outer diameter which is larger than a maximum outer diameter of the plunger.

3. The stirring stick of claim 1, wherein the collar has an outer diameter which is larger than an outer diameter of the cylindrically shaped portion.

4. The stirring stick of claim 1, wherein the collar has an outer diameter which is larger than a maximum outer diameter of the semi-spherically shaped dome.

5. A blender for blending foodstuff comprising:
   a base containing a motor;
   a blender jar releasably attached to the base, the blender jar being open at a top end and closed at a bottom end;
   a blade set drivingly connected to the motor, the blade set extending into the blender jar proximate the bottom end;
   a lid covering a substantial portion of the top end of the blender jar, the lid having an opening extending therethrough; and
   a stirring stick capable of being installed through the opening in the lid and into the blender jar from the top end, wherein the stirring stick comprises:
     an elongate plunger having first and second ends, the plunger having a single trough-shaped cavity extending between the first and second ends, the cavity having first and second side edges, the cavity being open between the first and second side edges to form a tapered opening extending from the first end to the second end;
     a scoop attached to the second end of the plunger, the scoop having a plunger tip forming a continuous, substantially planar, straight scraping edge separate from and extending beyond the first and second side edges;
     a handle attached to the first end of the plunger, the handle including a generally frustoconically-shaped collar connected to the first end of the plunger, and a top grippable portion having a plurality of external ribs, the top portion being connected to the collar.

6. The blender of claim 5, wherein the collar includes a substantially planar base, and the top portion is connected to the base.

7. The blender of claim 5, wherein the collar has a maximum outer diameter which is larger than a maximum outer diameter of the plunger.

8. The blender of claim 5, wherein the collar has a maximum outer diameter which is larger than a maximum outer diameter of the top portion.

* * * * *